US007008206B2

(12) United States Patent
Fong et al.

(10) Patent No.: US 7,008,206 B2
(45) Date of Patent: Mar. 7, 2006

(54) VENTILATION AND COOLING IN SELECTIVE DEPOSITION MODELING

(75) Inventors: Jon Jody Fong, Calabasas, CA (US); Raymond M. Soliz, Chatsworth, CA (US); Gary Lee Reynolds, Santa Clarita, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 10/180,380

(22) Filed: Jun. 24, 2002

(65) Prior Publication Data

US 2003/0235635 A1 Dec. 25, 2003

(51) Int. Cl.
*B29C 67/00* (2006.01)

(52) U.S. Cl. ........................................ 425/73; 425/174

(58) Field of Classification Search ................. 96/252; 454/252, 62; 425/174, 174.4, 73
See application file for complete search history.

(56) References Cited

U.S. PATENT DOCUMENTS 4,634,368 A * 1/1987 Diaz .......................... 425/453
4,934,920 A * 6/1990 Yamauchi et al. ............ 425/73
5,136,515 A 8/1992 Helinski
5,204,055 A 4/1993 Sachs et al.
5,216,616 A 6/1993 Masters
5,312,297 A * 5/1994 Dieckert et al. ............ 454/238
5,340,433 A 8/1994 Crump
5,534,309 A * 7/1996 Liu ........................... 427/458
5,555,176 A 9/1996 Menhennett et al.
5,704,955 A * 1/1998 Giles ............................ 96/26
5,717,572 A 2/1998 Smith et al.
5,855,836 A 1/1999 Leyden et al.
5,866,058 A 2/1999 Batchelder et al.
5,904,889 A * 5/1999 Serbin et al. ............... 264/401
6,133,355 A 10/2000 Leyden et al.
6,198,628 B1 3/2001 Smith
6,259,962 B1 7/2001 Gothait
2002/0016386 A1 2/2002 Napadensky

FOREIGN PATENT DOCUMENTS

WO 97/11837 4/1997
WO 00/11092 3/2000
WO 01/26023 A1 4/2001
WO 01/68375 A2 9/2001

OTHER PUBLICATIONS

U.S. Appl. No. 09/970,956, filed Oct. 3, 2001 by Varnon et al.

(Continued)

*Primary Examiner*—Duane Smith
*Assistant Examiner*—Emmanuel S. Luk
(74) *Attorney, Agent, or Firm*—James E. Curry; Ralph D'Alessandro

(57) ABSTRACT

A ventilation and cooling system for a selective deposition modeling apparatus dispensing a curable material. The ventilation and cooling system captures airborne contaminants in the apparatus making the apparatus suitable for use in an office environment. A pressure drop is established within the apparatus to assure that all air that enters the apparatus passes through a filter which captures the airborne contaminants before the air is expelled from the apparatus. Sensors are provided to assure that the ventilation and cooling system is function properly, and if not, the apparatus is either shut down or a signal is provided to the operator indicating that the system is not functioning properly.

22 Claims, 10 Drawing Sheets

OTHER PUBLICATIONS

U.S. Appl. No. 09/971,247, filed Oct. 3, 2001 by Schmidt et al.
U.S. Appl. No. 09/971,337, filed Oct. 3, 2001 by Schmidt.
U.S. Appl. No. 10/001,727, filed Dec. 5, 2001 by Fong.
U.S. Appl. No. 10/140,426, filed May 7, 2002 by Sherwood.
U.S. Appl. No. 10/157,575, filed May 28, 2002 by Fong.

* cited by examiner

VENTILATION AND COOLING IN SELECTIVE DEPOSITION MODELING

BACKGROUND OF THE INVENTION

1. Field of the Invention

The invention relates in general to solid deposition modeling, and in particular to a method and apparatus for providing ventilation and cooling to make solid deposition modeling with curable materials viable in an office environment.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature.

In most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM," a build material is typically jetted or dropped in discrete droplets, or extruded through a nozzle, in order to solidify on contact with a build platform or previous layer of solidified material in order to build up a three-dimensional object in a layerwise fashion. Other synonymous names for SDM which are used in this industry are solid object imaging, solid object modeling, fused deposition modeling, selective phase area deposition, multi-phase jet modeling, three-dimensional printing, thermal stereolithography, selective phase area deposition, ballistic particle manufacturing, fused deposition modeling, and the like. Ballistic particle manufacturing is disclosed in, for example, U.S. Pat. No. 5,216,616 to Masters. Fused deposition modeling is disclosed in, for example, U.S. Pat. No. 5,340,433 to Crump. Three-dimensional printing is disclosed in, for example, U.S. Pat. No. 5,204,055 to Sachs et al. Often a thermoplastic material to having a low-melting point is used as the solid modeling material in SDM; which is delivered through a jetting system such as an extruder or print head. One type of SDM process which extrudes a thermoplastic material is described in, for example, U.S. Pat. No. 5,866,058 to Batchelder et al. One type of SDM process utilizing ink jet print heads is described in, for example, U.S. Pat. No. 5,555,176 to Menhennett et al.

Recently, there has developed an interest in utilizing curable materials in SDM. One of the first suggestions of using a radiation curable build material in SDM is found in U.S. Pat. No. 5,136,515 to Helinski, wherein it is proposed to selectively dispense a UV curable build material in an SDM system. Some of the first UV curable material formulations proposed for use in SDM systems are found in Appendix A of International Patent Publication No. WO 97/11837, where three reactive material compositions are provided. More recent teachings of using curable materials in various selective deposition modeling systems are provided in U.S. Pat. No. 6,259,962 to Gothait; U.S. Pat. Nos. 6,133,355 and 5,855,836 to Leyden et al; U.S. Pat. App. Pub. No. U.S. 2002/0016386 A1; and International Publication Numbers WO 01/26023, WO 00/11092, and WO 01/68375.

These curable materials generally contain photoinitiators and photopolymers which, when exposed to ultraviolet radiation (UV), begin to cross-link and solidify. As this occurs, a significant amount of exothermic heat is produced, which must be removed from the system as objects are built. In addition, care must be taken in working with these materials as prolonged dermal contact can lead to sensitization, and their vapors can provide undesirable odors. Thus, it is important to minimize human contact with these materials when in liquid form, and to prevent these materials from becoming airborne in an office environment when in vapor form.

For SDM systems that selectively dispense curable materials, a radiation curing step is needed to initiate the curing process. However, radiation curing exposure systems themselves generate significant amounts of heat, whether they are flash systems or continuous flood systems. The high levels of heat generated by these lamps pose significant problems in SDM. For instance, the heat generated by these lamps can thermally initiate curing of the material in the SDM dispensing device or material delivery system rendering the apparatus inoperable. Being able to remove this heat in an SDM apparatus is crucial to acceptable operation of the system.

One of the advantages of first generation SDM machines that worked with thermoplastic waxes to build objects was that the machines could be used in an office environment. This is because the waxes are essentially benign in nature, requiring no need to prevent human contact. Further, power consumption and heat generation is not much more when dispensing these materials from SDM compared to other office equipment such as photocopier. However, making an SDM apparatus utilizing curable materials for use in an office environment is no trivial task. Power consumption must be kept at a minimum so as to meet conventional power requirements found in an office, such as 20 A/115V service. Heat generation must be kept low enough so that standard office air conditioning systems can maintain a comfortable office environment, and the cooling system of the SDM apparatus must be sufficient to remove the generated heat from the system. Also the ventilation system must be able to trap vapors within the apparatus and prevent their potentially odorous release into the office environment.

Thus, there is a need to develop an inexpensive ventilation and cooling system for use in an SDM apparatus capable of removing large amounts of localized heat while also preventing vapors from being released into the environment. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to provide a ventilation and cooling system for an SDM apparatus that captures airborne contaminants within the apparatus.

It is another aspect of the present invention to provide a ventilation and cooling system for an SDM apparatus that establishes a pressure difference or drop within the apparatus that is less than atmospheric pressure.

It is a feature of the present invention that all air that passes through an SDM apparatus utilizing the present invention ventilation and cooling system passes though a filter that captures substantially all airborne contaminants.

It is another feature of the present invention that a pressure sensor can shut down the SDM apparatus or signal the operator when the ventilation and cooling system is not functioning properly.

It is yet another feature of the present invention that a pressure sensor can shut down the SDM apparatus or signal the operator when the filter of the ventilation and cooling system needs replacement.

It is an advantage of the present invention that an SDM apparatus utilizing curable build materials can be operated in an office environment.

These and other aspects, features, and advantages are achieved/attained in the method and apparatus of the present invention. The present invention ventilation and cooling method comprises providing a containment chamber surrounding a selective deposition modeling apparatus having at least one air inlet duct and at least one air exit duct; establishing a first flow of air entering the apparatus through the air inlet duct; establishing a second flow of air exiting the apparatus through the air exit duct; and passing the second flow of air through a filter prior to the second flow of air exiting the apparatus. The filter captures airborne contaminants from the second flow of air containing vapors of the curable build material. The second flow of air has a flow rate that is greater than the flow rate of the first flow of air which establishes a third flow of air that is drawn into the apparatus through unsealed gaps in the containment chamber. A steady state condition is established wherein the flow rate of the third flow of air, when added to the flow rate of the first flow of air, substantially equals the flow rate of the second flow of air. When the steady state condition is established, the pressure inside the containment chamber is less than atmospheric pressure. This assures that all air entering the SDM apparatus passes through the filter prior to being expelled from the apparatus.

The present invention ventilation and cooling system for a selective deposition modeling apparatus comprises a containment chamber surrounding the apparatus having at least one air inlet duct and at least one air exit duct, at least one air-moving device in communication with the air inlet duct creating a first flow of air entering the apparatus, at least one air-moving device in communication with the air exit duct creating a second flow of air exiting the apparatus, and a filter in communication with the air exit duct for receiving the second flow of air to capture airborne contaminants from the second flow of air. The second flow of air has a flow rate greater than the flow rate of the first flow of air, which establishes a third flow of air entering the apparatus through unsealed gaps in the containment chamber. The pressure inside the containment chamber is less than atmospheric pressure, and a pressure sensor can be provided to monitor this pressure difference to either shut off the apparatus or signal the operator that the ventilation and cooling system is not functioning properly.

A present invention selective deposition modeling apparatus comprises a support means affixed to the apparatus for supporting three-dimensional objects in the build environment, a dispensing means affixed to the apparatus and in communication with the support means for dispensing a curable material in the build environment according to computer data to form the layers of the three-dimensional object, a flash exposure means affixed to the apparatus for curing the dispensed material, a flash cooling system in communication with the flash exposure means for providing steady state cooling of the flash exposure means, and a ventilation and cooling system for capturing airborne contaminants in the apparatus. The ventilation and cooling system comprises a containment chamber surrounding the selective deposition modeling apparatus having at least one air inlet duct and one air exit duct, at least one air-moving device in communication with the air inlet of the containment chamber creating a first flow of air entering the apparatus, at least one air-moving device in communication with the air exit duct creating a second flow of air exiting the apparatus, and a filter in communication with the air exit duct for receiving the second flow of air to capture airborne contaminants from the second flow of air. Because of the ventilation and cooling system, the SDM apparatus is suitable for operation in an office environment.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

Figure 1:
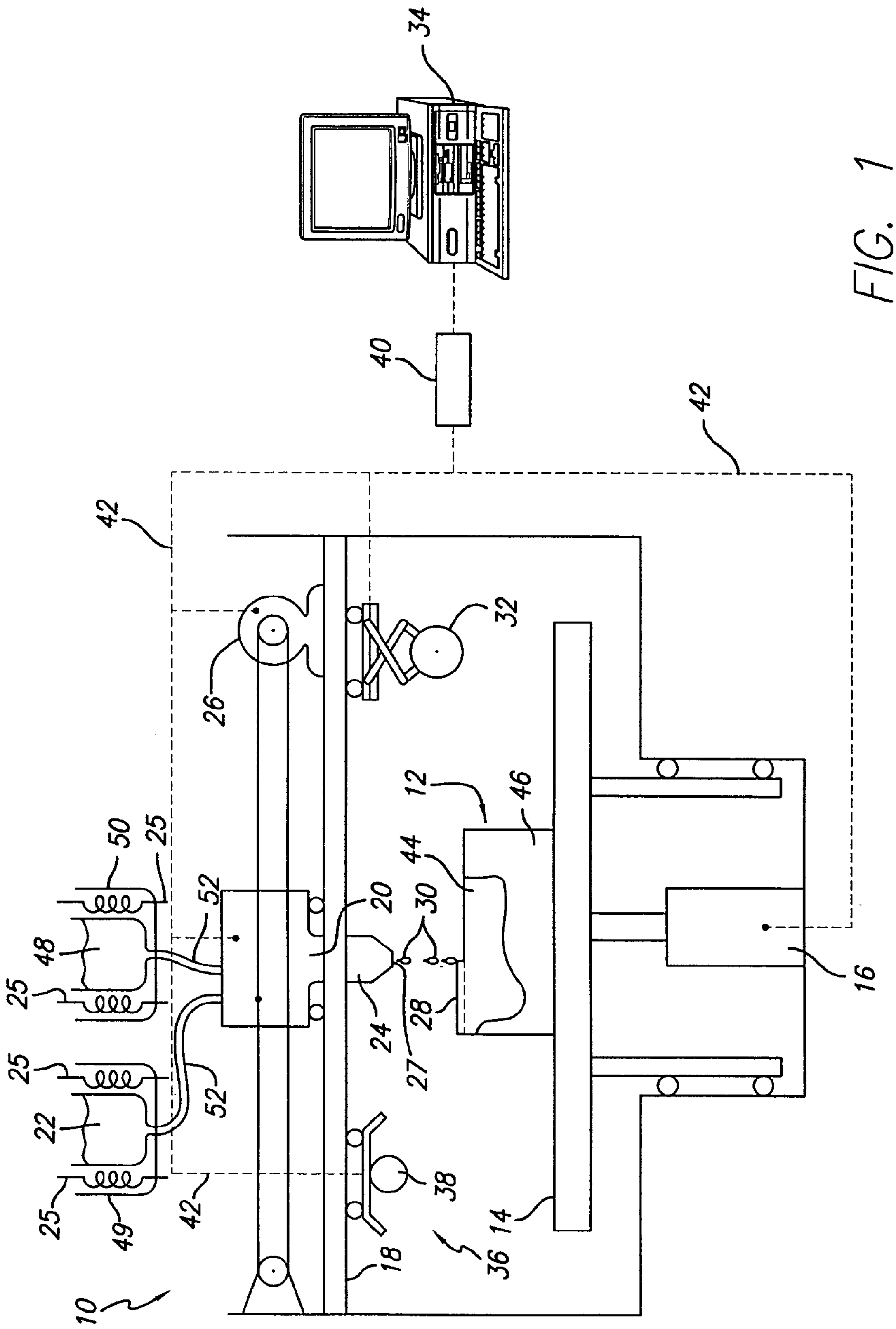
FIG. 1 is a diagrammatic side view of a solid deposition modeling apparatus incorporating the present invention flash cure system.

While the ventilation and cooling techniques of the present invention are applicable to all SFF techniques, the invention will be described with respect to an SDM apparatus utilizing an ink jet print head dispensing an ultraviolet radiation curable phase change material. However, it is to be appreciated that the ventilation and cooling techniques of the present invention can be adapted for use with any SFF apparatus generating airborne contaminants in order to make the apparatus acceptable for use in an office environment.

As used herein, the term "a flowable state" of a build material is a state wherein the material is unable to resist shear stresses that are induced by a dispensing device, such as those induced by an ink jet print head when dispensing the material, causing the material to move or flow. Preferably, the flowable state of the build material is a liquid state, however, the flowable state of the build material may also exhibit thixotropic-like properties. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel state, or paste state, are examples of a non-flowable state of a build material for the purposes herein. In addition, the term "cured" or "curable" refers to any polymerization reaction. Preferably, the polymerization reaction is triggered by controlled exposure to actinic radiation or thermal heat. Most preferably, the polymerization reaction involves the cross-linking of monomers and oligomers initiated by exposure to actinic radiation in the ultraviolet wavelength band. Further, the term "cured state" refers to a material, or portion of a material, in which the polymerization reaction has substantially completed. It is to be appreciated that as a general matter the material can easily transition between the flowable and non-flowable state prior to being cured; however, once cured, the material cannot transition back to a flowable state and be dispensed by the apparatus. In addition, the term "airborne contaminants" includes any particulate matter that may be suspended in air and also any airborne vapors of both the curable phase change build material and phase change support material. Furthermore, the term "air-moving device" refers to any device that can establish a flow of air, such as an axial fan, a centrifugal fan, a mixed flow fan, a cross flow fan, and combinations thereof. For the purposes herein, a positive displacement pump may also be used as an air-moving device, if desired The SDM apparatus incorporating the present invention ventilation and cooling system dispenses a curable phase change material from a Z850 piezoelectric ink jet print head available from Xerox Corporation of Wilsonville, Oreg., although other dispensing devices could be used, if desired. The material dispensed from the Z850 print head desirably has a viscosity of between about 13 to about 14 centipoise at a dispensing temperature of about 80° C. The dispensing methodology of this system is described in greater detail in U.S. patent application Ser. No. 09/971,337, assigned to the assignee of the present invention.

A number of radiation curable phase change formulations were developed to be dispensed by the Z850 print head to form three-dimensional objects. An exemplary build material formulation comprises 6.5% by weight Urethane Acrylate (CN980), 6.0% by weight Epoxy Acrylate (E3200), 18.7% by weight Urethane Acrylate (CN2901), 41.05% by weight Triethylene glycol dimethacrylate (SR205), 12.0% by weight Polypropylene Glycol Monomethacrylate (SR604), 10.0% by weight Urethane Wax (ADS038), 2.0% by weight Urethane Wax (ADS043), and 3.75% by weight Photo-initiator (I-184). The components CN 980, CN2901, SR 205, SR604, and SR 493D are available from Sartomer Company, Inc. of Exton, Pa. The components ADS038 and ADS043 are available from American Dye Source, Inc. of Quebec, Canada. The component E3200 is available from UCB Chemical, Inc. of Atlanta, Ga., and the component I-184 is available from Ciba Specialty Chemicals, Inc. of New York, N.Y.

An exemplary non-curable phase change support material formulation comprises 70% by weight octadecanol available from Ruger Chemical Co., Inc., of Irvington, N.J, and 30% by weight of a tackifier sold under the designation of KE 100 available from Arakawa Chemical (USA) Inc., of Chicago, Ill. Further details pertaining to the build and support materials are found in U.S. patent application Ser. No. 09/971,247, assigned to the assignee of the present invention.

Referring particularly to FIG. 1 there is illustrated generally by the numeral 10 an to SDM apparatus incorporating a flash exposure system illustrated generally by numeral 36. In this SDM apparatus, the flash exposure system 36 generates significant amounts of localized heat that is removed by the flash cooling system and the ventilation and cooling system of the present invention (not shown in FIG. 1). The SDM apparatus 10 is shown building a three-dimensional object 44 on a support structure 46 in a build environment shown generally by the numeral 12. The object 44 and support structure 46 are built in a layer by layer manner on a build platform 14 that can be precisely positioned vertically by any conventional actuation means 16. Directly above and parallel to the platform 14 is a rail system 18 on which a material dispensing trolley 20 resides carrying a dispensing device 24. Preferably, the dispensing device 24 is the Z850 piezoelectric ink jet print head that dispenses the build material and the support material. However, other ink jet print head types could be used, such as an acoustic or electrostatic type, if desired. Alternatively a thermal spray nozzle could be used instead of an ink jet print head, if desired.

The trolley carrying the dispensing device 24 is fed the curable phase change build material 22 from a remote reservoir 49. The remote reservoir is provided with heaters 25 to bring and maintain the curable phase change build material in a flowable state. Likewise, the trolley carrying the dispensing device 24 is also fed the non-curable phase change support material 48 from remote reservoir 50 in the flowable state. In order to dispense the materials, a heating means is provided to initially heat the materials to the flowable state, and to maintain the materials in the flowable state along its path to the print head. The heating means comprises heaters 25 on both reservoirs 49 and 50, and additional heaters (not shown) on the umbilicals 52 connecting the reservoirs to the dispensing device 24. Located on the dispensing device 24 is a plurality of discharge orifices 27 for dispensing both the build material and support material, although just one is shown in FIG. 1.

The dispensing device 24 is reciprocally driven on the rail system 18 along a horizontal path by a conventional drive means 26 such as an electric motor. Generally, the trolley carrying the dispensing device 24 takes multiple passes to dispense one complete layer of the materials from the discharge orifices 27. In FIG. 1, a portion of a layer 28 of dispensed build material is shown as the trolley has just started its pass from left to right. Dispensed droplets 30 are shown in mid-flight, and the distance between the discharge orifice and the layer 28 of build material is greatly exaggerated for ease of illustration. The layer 28 may be all build material, all support material, or a combination of build and support material, as needed, in order to form and support the three-dimensional object.

The initial layer thickness established during dispensing is greater than the final layer thickness, and a planarizer 32 is drawn across the layer to smooth the layer and normalize the layer to establish the final layer thickness. The planarizer 32 is used to normalize the layers as needed in order to eliminate the accumulated effects of drop volume variation, thermal distortion, and the like, which occur during the build process. The planarizer 32 may be mounted to the material dispensing trolley 20 if desired, or mounted separately on the rail system 18, as shown.

A waste collection system (not shown in FIG. 1) is used to collect the excess material generated during planarizing. The waste collection system may comprise an umbilical that delivers the material to a waste tank or waste cartridge, if desired. A preferred waste system for curable phase change materials is disclosed in U.S. patent application Ser. No. 09/970,956 assigned to the assignee of the present invention. The system is discussed further in conjunction with FIG. 2.

Referring back to FIG. 1, an external computer 34 generates or is provided with a solid modeling CAD data file containing three-dimensional coordinate data of an object to be formed. Typically the computer 34 converts the data of the object into surface representation data, most commonly into the STL file format and also establishes support region data for the object. When a user desires to build an object, a print command is executed at the external computer in which the STL file is processed, through print client software, and sent to the computer controller 40 of the SDM apparatus 10 as a print job. The processed data transmitted to the computer controller 40 can be sent by any conventional data transferable medium desired, such as by magnetic disk tape, microelectronic memory, network connection, or the like. The is computer controller processes the data and executes the signals that operate the apparatus to form the object. The data transmission route and controls of the various components of the SDM apparatus are represented as dashed lines at 42.

In FIG. 1, the flash exposure system 36 is mounted on rail system 18. The flash exposure system 36 is reciprocally driven along rail system 18 to scan the radiation source over a just dispensed layer of material. The flash exposure system 36 includes flash lamp 38, which is used to provide a planar (flood) exposure of UV radiation to each layer as needed. The flash exposure system 36 is discussed in greater detail in conjunction with FIG. 3.

Figure 2:
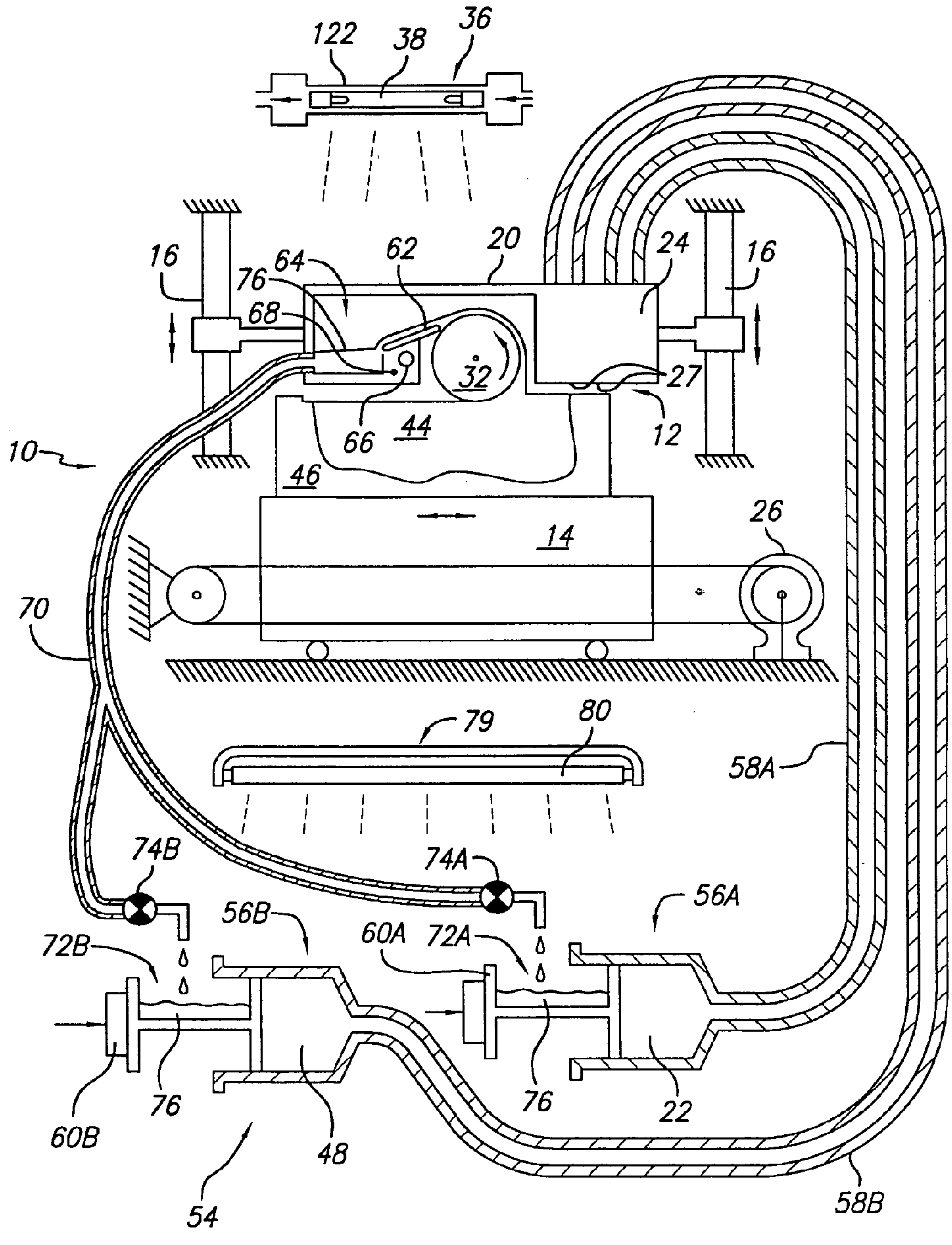
FIG. 2 is a diagrammatic side view of a preferred solid deposition modeling apparatus incorporating the present invention flash curing system.

Referring to FIG. 2 there is illustrated generally by the numeral 10 another SDM apparatus suited for incorporating the present invention ventilation and cooling system (not shown). The apparatus 10 in FIG. 2 has the same the flash exposure system 36 as the SDM apparatus 10 of FIG. 1. This apparatus 10 is shown including schematically a material feed and waste system illustrated generally by numeral 54. In contrast to the SDM apparatus shown in FIG. 1, the build platform 14 in this apparatus is reciprocally driven by the conventional drive means 26 instead of the dispensing trolley 20. The dispensing trolley 20 is precisely moved by actuation means 16 vertically to control the thickness of the layers of the object. Preferably, the actuation means 16 comprises precision lead screw linear actuators driven by servomotors. The ends of the linear actuators 16 reside on opposite ends of the build environment 12 and in a transverse direction to the direction of reciprocation of the build platform. However, for ease of illustration in FIG. 2 they are shown in a two-dimensionally flat manner giving the appearance that the linear actuators are aligned in the direction of reciprocation of the build platform 14. Although they may be aligned with the direction of reciprocation, it is preferred they be situated in a transverse direction so as to optimize the use of space within the apparatus.

In the build environment generally illustrated by numeral 12, there is shown by numeral 44 a three-dimensional object being formed with integrally formed supports 46. The curable phase change build material identified by numeral 22 is dispensed by the apparatus 10 to form the three-dimensional object 44, and the non-curable phase change material identified by numeral 48 is dispensed to form the support 46. Containers identified generally by numerals 56A and 56B, respectively, hold a discrete amount of these two materials 22 and 48. Umbilicals 58A and 58B, respectively, deliver the material to the dispensing device 24. The materials 22 and 48 are heated to a flowable state, and heaters (not shown) are provided on the umbilicals 58A and 58B to maintain the materials in the flowable state as they are delivered to the dispensing device 24. When the dispensing device 24 needs additional material 22 or 48, extrusion bars 60A and 60B are respectively engaged to extrude the material from the containers 56A and 56B, through the umbilicals 58A and 58B, and to the dispensing device 24.

The dispensing trolley 20 shown in FIG. 2 carries the heated planarizer 32 in contrast to the embodiment in FIG. 1. The planarizer 32 removes the excess flowable material as the planarizer rotates, which brings the material up to the skive 62 which is in contact with the planarizer 32. The skive 62 separates the material from the surface of the planarizer 32 and directs the flowable material into a waste reservoir, identified generally by numeral 64 located on the trolley 20. A heater 66 and thermistor 68 on the waste reservoir 64 operate to maintain the temperature of the waste reservoir at a sufficient point so that the waste material in the reservoir remains in the flowable state.

The waste reservoir is connected to a heated waste umbilical 70 for delivery of the waste material to the waste receptacles 72A and 72B. For each waste receptacle 72A and 72B, there is associated a solenoid valve 74A and 74B, for regulating the delivery of waste material 76 to the waste receptacles. A detailed discussion of the feed and waste system is disclosed in U.S. patent application Ser. No. 09/970,956 assigned to the assignee of the present invention.

In FIG. 2 an additional flash exposure system is generally shown by numeral 79 comprising a lamp 80. The flash exposure system 79 is provided separately to expose the waste material in the waste receptacles to radiation in order to cure the waste material in the waste receptacles. The flash exposure system 36 is shown comprising lamp 38 and chamber 122. It is to be appreciated that these flash exposure systems, 36 and 79, generate heat, which is removed by the ventilation and cooling system of the present invention.

Figure 3:
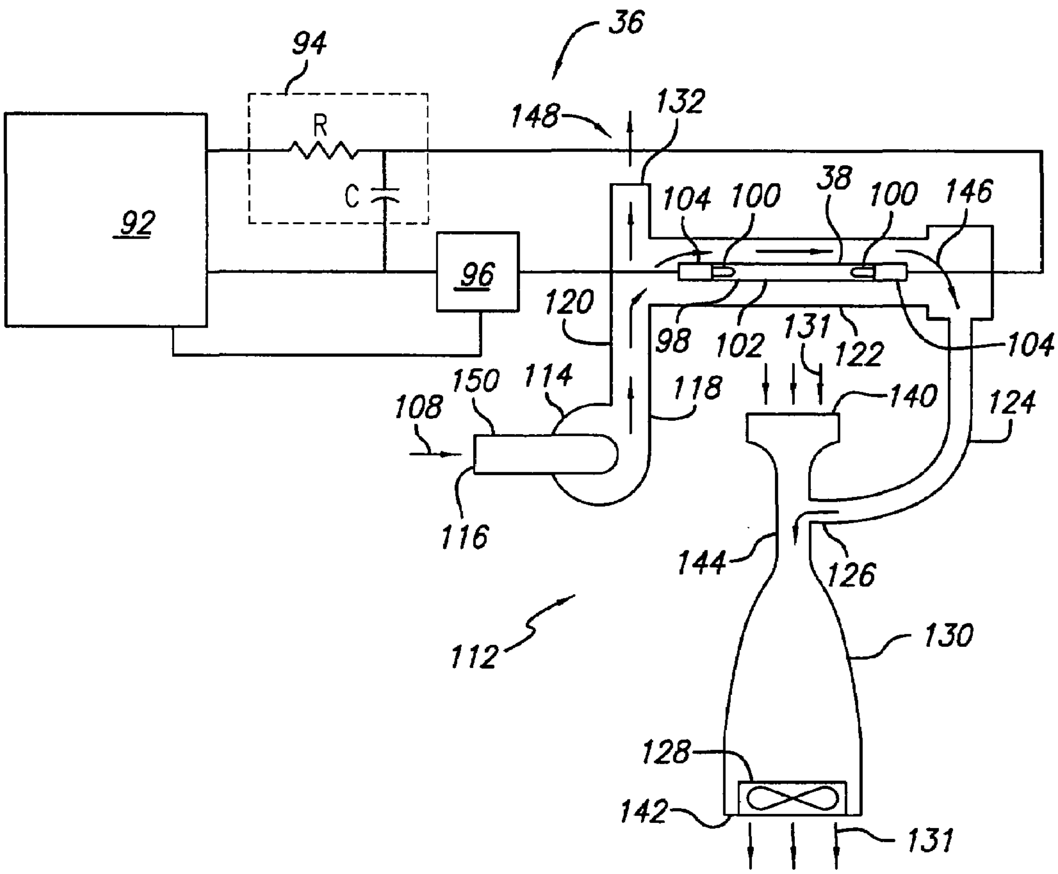
FIG. 3 is an electrical schematic of the present invention flash curing system.

Referring now to FIG. 3, an electrical schematic of the flash exposure system 36 is shown that incorporates a flash cooling system generally identified by numeral 112. Discussed in conjunction with FIG. 4, the flash cooling system 112 is connected to the ventilation and cooling system of the present invention. Referring back to FIG. 3, the flash exposure system 36 utilizes a xenon flash lamp 38 which emits a large amount of spectral energy (radiation) in short duration pulses. A DC power supply 92 provides direct current voltage to both the pulse forming network 94 and the trigger 96. The power supply 92 is provided with AC power and converts this to DC power for use by the flash exposure system 36. The power supply 92 was produced by Kaiser Systems, Inc., of Beverly, Mass. The pulse forming network 94 was produced by PerkinElmer Optoelectronics of Salem, Mass. Flashing of the xenon lamp is initiated by the trigger 96, which creates a voltage gradient (Volts/inch) in the xenon gas in the lamp that causes ionization. The trigger 96 is a series induction trigger produced by PerkinElmer Optoelectronics under the designation TR-204 series injection transformer. The xenon flash lamp 38 comprises a thermally matched hollow quartz glass tube 102 and sealed electrode ends 104, which encapsulate the xenon gas in the lamp.

Tungsten electrodes 100 reside in the glass tube 102 and are approximately 10 inches apart. The lamp 38 is contained in chamber 122, which is configured to reduce electro-magnetic irradiation and allow a cooling stream of air 146 to flow across the lamp 38. The xenon flash lamp was produced by PerkinElmer Optoelectronics for 3D Systems, Inc. as part number FXQG-1700-10. A detailed discussion of the flash exposure system 36 is disclosed in U.S. patent application Ser. No. 10/140,426 entitled "Flash Curing in Selective Deposition Modeling."

In FIG. 3, the flash cooling system 112 for the flash exposure system 36 is provided air by the present invention ventilation and cooling system. Only a few components of the ventilation and cooling system are shown in FIG. 3. Part of the ventilation and cooling system comprises a air-moving device 114 having an air inlet 116 for receiving air and an air outlet 118 for supplying the air to air duct 120. Air-moving device 114 provides a first flow of air 108 that enters the SDM apparatus through air inlet duct 150. The air-moving device 114 delivers the first flow of air 108 from outside the apparatus to air duct 120 and to other systems in the apparatus if desired, as identified generally by numeral 148. The air duct 120 is in communication with chamber 122, which makes outside air available for cooling the lamp 38. It is preferred that the flash cooling system 112 utilizes outside air to cool the lamp 38 instead of the air inside the apparatus 10. This is because build material vapors may be present in the air inside the apparatus, which if allowed to enter the chamber 122, would be cured in the chamber and eventually render the flash curing system 36 inoperative. However, an activated charcoal filter could be used as the filter to remove the vapors from the inside air prior to using the air to cool the lamp 38, if desired, such as a filter utilizing the AQF® activated media liners available from AQF Technologies, LLC, of Charlotte, N.C. Filters utilizing the AQF® activated media liners are available from Filtration Group, Inc., of Jollet, Ill.

In the flash cooling system 112, the desired flow rate of air for cooling the lamp 38 is established by the provision of a low-pressure zone at a low-pressure port 126 that is connected to the chamber 122 via air duct 124. It is the low-pressure zone, which draws air 146 at a desired flow rate across the lamp 38 and through the chamber 122 to provide steady state cooling of the lamp 38. The low-pressure zone is established by providing at least one air-moving device 128 that creates a second flow of air 131 that travels through a venturi duct 130 and out of the apparatus. The air-moving device 128 and venturi duct 130 are also part of the ventilation and cooling system of the present invention (shown generally by numeral 134 in FIG. 4). Referring back to FIG. 3, the venturi duct 130 has an inlet end 140, an exit end 142, and a restriction chamber or throat 144 wherein the low-pressure zone is established. For the SDM apparatus 10 of FIG. 2, the desired ventilation air flow rate of the second flow of air 131 is between about 80 CFM to about 300 CFM, and more preferably between about 135 CFM to about 250 CFM. Further, the desired pressure drop at port 126 (compared to atmospheric pressure) is between about 1 to about 2.5 inches of water (In $H_2O$). The flash cooling system 112 is discussed in greater detail, including how to select an appropriate fan and venturi configuration, in U.S. patent application Ser. No. 10/157,575, filed May 28, 2002 by Fong.

Figure 4:
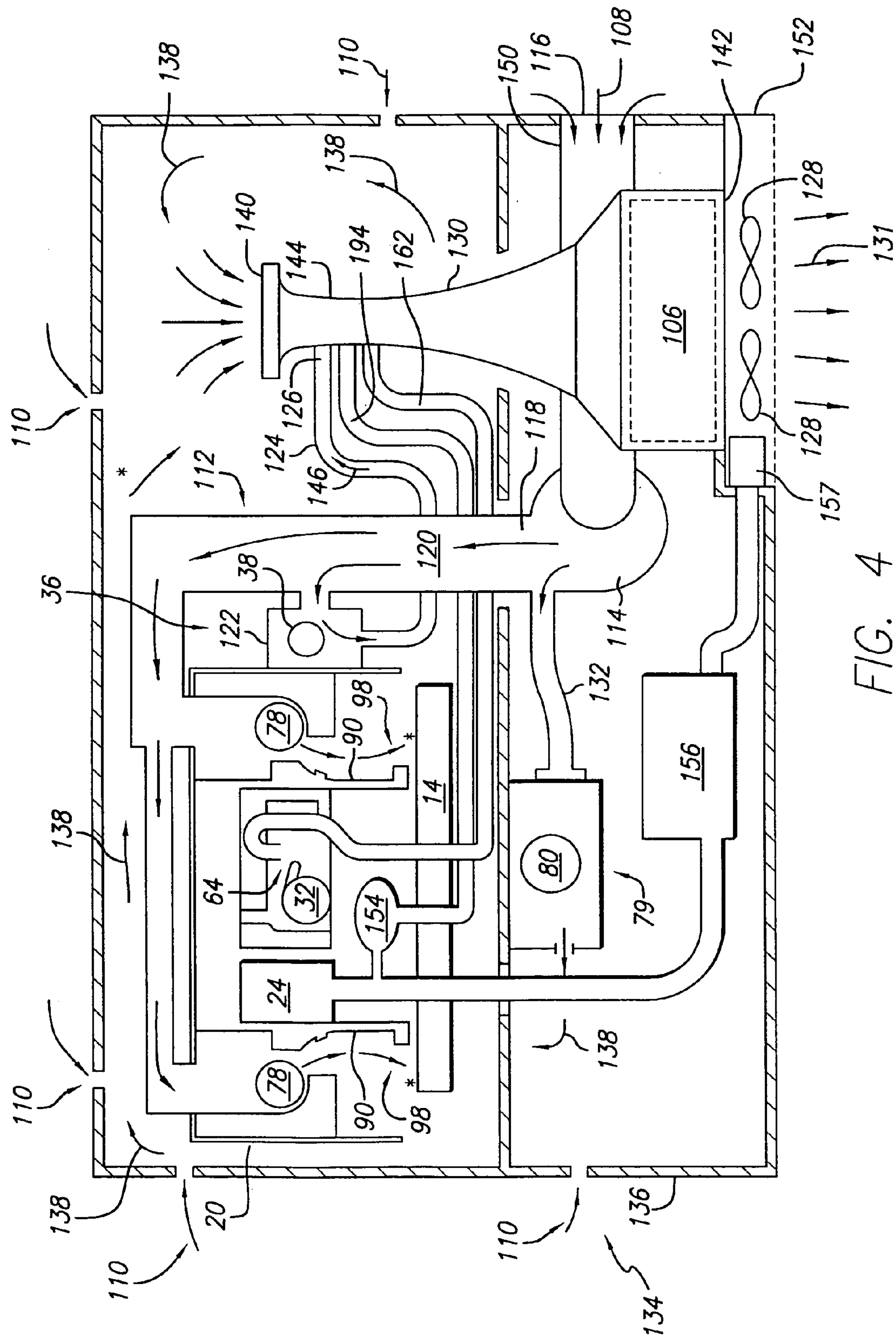
FIG. 4 is a cross-sectional view of reflector housing assembly for the present invention flash system.

Referring now to FIG. 4, a first embodiment of the present invention ventilation and cooling system is schematically shown and identified generally by numeral 134. The ventilation and cooling system 134 is inside the selective deposition modeling apparatus of which only the dispensing trolley 20 and build platform 14 are shown for ease of illustration. The selective deposition modeling apparatus and ventilation and cooling system 134 is surrounded by containment chamber 136. The ventilation and cooling system 134 is adapted to ventilate and cool the SDM apparatuses discussed in conjunction with FIGS. 1 and 2. In FIG. 4, the flash cooling system 112 is shown as it is connected to the ventilation and cooling system 134. Air-moving device 114 draws the first flow of air 108 into air inlet 116 and to air duct 120. Air duct 120 provides this air to chamber 122 for cooling the lamp 38 and to fans 78 on the dispensing trolley 20. Fans 78 and their associated air ducts 90 establish substantially uniform sheets of air flow away from the dispensing device 24. These uniform sheets of air flow, generally shown by numeral 98, remove heat from the layers of three-dimensional objects as they are formed by the SDM apparatus. A detailed discussion on establishing the uniform sheets of air flow are provided in U.S. patent application Ser. No. 10/001,727 assigned to the assignee of the present invention.

The air duct 120 also provides air to the flash exposure system 79 through air passage 132 which is vented inside the apparatus within the containment chamber 136. In addition, the uniform sheets of air flow 98 are also vented inside the apparatus. These three air flows absorb heat by convection during the build process which, in addition to the heat generated from other heat generating components, such as the power supply 92, computer controller 40, and drive means 26, raise the air temperature inside the apparatus. This heated air rises, as indicated by numerals 138, and is drawn into the venturi duct 130 and is combined with air flow 146 to establish the second flow of air 131. The second flow of air 131 is expelled through the exit end 142 of the venturi duct 130 by the air moving devices 128 and out of the containment chamber 136 through air exit duct 152, thereby expelling the heat generated by the apparatus.

The second flow of air 131 passes through filter 106 before exiting the apparatus. Importantly, the filter 106 captures airborne contaminants and prevents the contaminants from exiting the containment chamber and into the local environment. Preferably the filter 106 is an activated charcoal filter capable of capturing airborne contaminants at flow rates of between about 80 CFM to about 300 CFM with a minimal pressure drop across the filter. The aforementioned activated charcoal filters available from Filtration Group, Inc., of Jollet, Ill. are preferred for this application.

Importantly, the ventilation and cooling system 134 is configured so that the second flow of air 131 that exits the apparatus through the containment chamber 136, exits at a flow rate that is greater than the flow rate at which the first flow of air 108 enters the apparatus through containment chamber 136. The containment chamber 136, which is comprised of removable outer panels and hinged doors of the apparatus, is not air-tight. Since the second flow of air 131 exiting the apparatus is greater than the first flow of air 108 entering the apparatus through air inlet 116, the pressure inside the containment chamber is below atmospheric pressure. This pressure difference or drop assures that a third flow of air is established that enters the apparatus by passing through all the unsealed gaps of the containment chamber 136, as identified generally by numeral 110. A steady state condition is achieved when the flow rate of the first flow of air 108, when combined with the flow rate of the third flow of air 110 substantially equals the flow rate of the second flow of air 131. This steady state condition establishes a pressure drop in the apparatus that assures that all the air that passes into the SDM apparatus will pass through filter 106, wherein substantially all airborne contaminants are captured, making the SDM apparatus safe for use in an office environment.

When the steady state condition between the first, second, and third air flows is established, typically within about 30 seconds after starting the ventilation and cooling system, the pressure drop in the apparatus stabilizes and can be measured with a vacuum pressure sensor. A pressure sensor (not shown) can be configured to determine the pressure difference or drop in the apparatus, and when the pressure difference falls below a desired value the sensor can signal the operator of the SDM apparatus 10 that the ventilation and cooling system is not functioning properly, or can shut down the apparatus, if desired. Generally the ventilation and cooling system may not be functioning properly when the filter is blocked or clogged, when there is a fan failure, when there is a power failure, and when there is blockage to the air inlet or air exit ducts. Any one of these conditions will reduce or eliminate the pressure drop inside the containment chamber. In the embodiments herein, the pressure inside the so containment chamber when the steady state condition is established should be between about 0.05 In $H_2O$ to about 1.00 In $H_2O$ less than atmospheric pressure when the ventilation and cooling system is functioning properly. Generally, if the pressure difference is less than about 0.05 In $H_2O$, the ventilation and cooling system is not functioning properly, in which case airborne contaminants may undesirably escape from the containment chamber and into the local environment. This can be prevented by providing a pressure sensor that determines this pressure difference and shuts down the SDM apparatus when the determined pressure difference falls below about 0.05 In $H_2O$. There are a wide variety of ways to configure a pressure sensor to determine this pressure difference, of which one is discussed herein. Alternatively, the pressure sensor may signal the apparatus, by activating a warning light and/or audible signal from a speaker, to alert the operator that the ventilation and cooling system is not functioning properly. In addition the pressure sensor can signal any combination of a warning light, audible signal, or apparatus shut down, if desired.

It is also desirable to determine when the filter 106 needs replacement. Preferably some detection system can either shut down the SDM apparatus or signal to the operator to replace the filter when the filter needs replacement. The detection system can signal any combination of a warning light, audible signal, or apparatus shut down, if desired. Generally, the filter 106 needs to be replaced when the activated charcoal within the filter becomes saturated with airborne contaminants, and particularly when it becomes saturated with organic components such as vaporized build material. If a filter 106 is saturated with contaminants, the effectiveness of the ventilation and cooling system 134 will decrease and may no longer capture additional contaminants. In these circumstances the additional contaminants could be exhausted into the office environment, which is to be avoided.

The condition of a saturated filter can be detected with vacuum pressure sensor 154, which is connected to the venturi duct 130 at the restriction chamber 144 on one end, and to the dispensing device 24 at the other. The pressure sensor 154 is primarily used to maintain a vacuum on the material in the dispensing device 24 by providing a signal that is used by vacuum pressure regulator 156 which maintains the vacuum.

This vacuum (about 5.5 In $H_2O$ ) is needed because the preferred print head was not designed to dispense material vertically downward as it is configured in the SDM apparatuses 10 in FIGS. 1 and 2. If the vacuum is not provided to the print head, the material in the print head will drain out of the dispensing orifices. In order to maintain the slight vacuum the pressure regulator 156 vents air from the sealed dispensing device 24 through a filter 157 near the air exit duct 152. The amount of air vented through this filter 157 is insignificant in comparison to the flow rates of the first, second and third flows of air. When the ventilation and cooling system 134 is running, the pressure sensor 154 obtains a reading of the pressure difference between the restriction chamber 144 and the essentially constant vacuum applied to the dispensing device 24, which provides a baseline pressure measurement with respect to atmospheric pressure since the value of the constant vacuum applied to the dispensing device is known. Pressure port 194 is connected between the restriction chamber 144 and the pressure sensor 154 to provide for this pressure reading. There is no air flow through pressure port 194.

When the ventilation and cooling system is functioning properly the pressure in the restriction chamber 144 will always be lower than the pressure in the dispensing device 24. When the filter 106 becomes saturated with contaminants and needs to be replaced, the restriction in the filter causes the flow rate of the second flow of air 131 to decrease, which raises the pressure at the restriction chamber and reduces the pressure difference measured by the pressure sensor 154. Once the pressure sensor determines a pressure difference that is less than a minimum allowable pressure difference between the restriction chamber 144 and dispensing device 24, the sensor can either shut down the SDM apparatus or provide some feedback or warning signal. The warning signal may be a light or audible signal, if desired, which notifies the operator that the filter needs to be replaced. The minimum allowable pressure difference is sensitive to a multiplicity of variables and conditions, and it is best determined from empirical data taken from testing conducted on the final configuration of the ventilation and cooling system. For example, with a completed ventilation and cooling system, a pressure difference can be measured with a new filter, and another measurement made with a completely saturated filter and from the two measurements the point at which the pressure difference indicates that the filter needs to be replaced can be determined.

Figure 7:
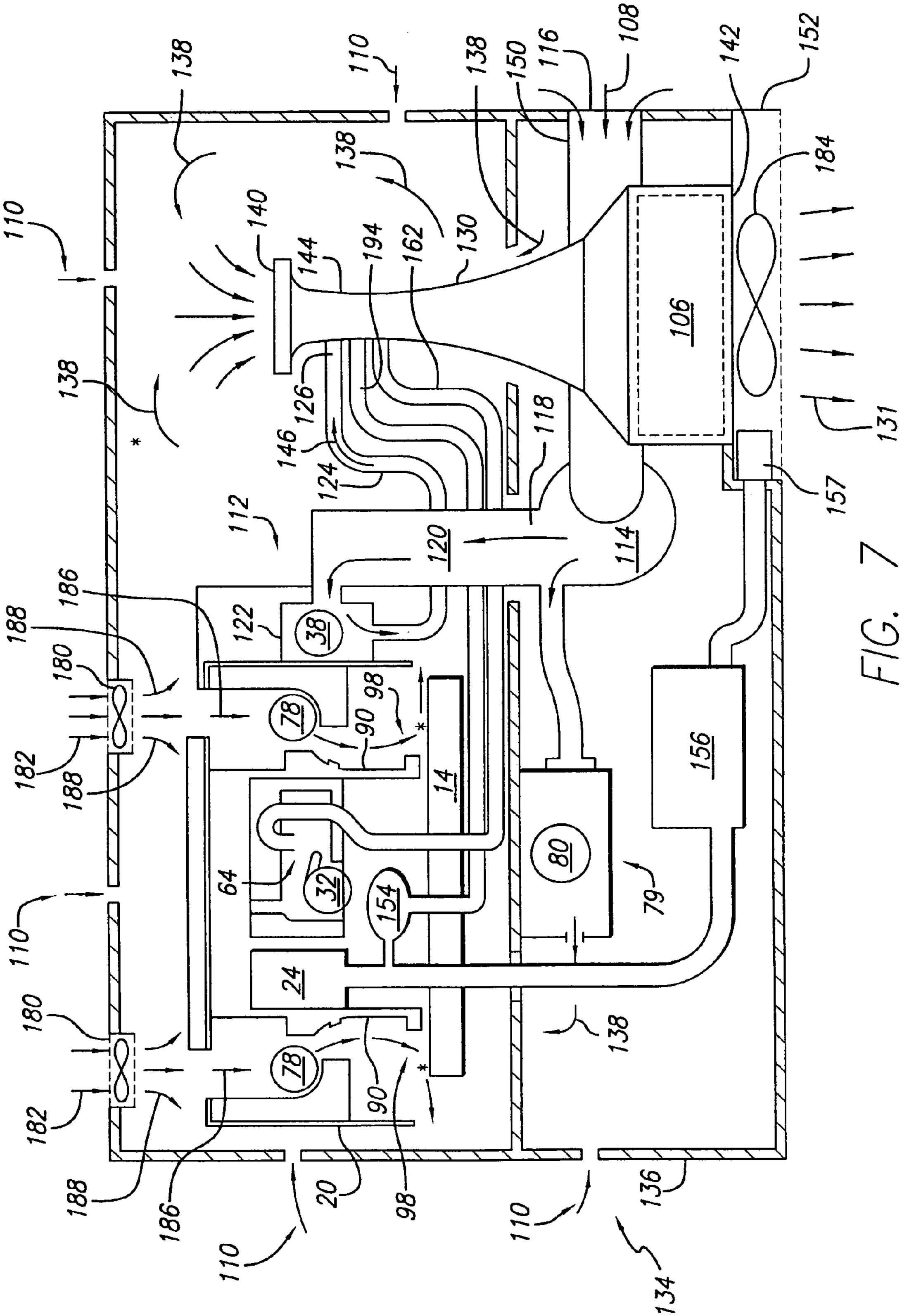
FIG. 7 is an isometric view of the apparatus of FIG. 2 for practicing the present invention.

It is to be appreciated that the pressure sensor 154, as configured in FIGS. 4 and 7, can be used to perform a number of diagnostic tests. For example, the pressure sensor can monitor the constant vacuum pressure being provided on the dispensing device 24, can monitor the pressure drop within the containment chamber 136, and can monitor the pressure drop across the filter 106. Although separate pressure sensors can be provided for any one of these diagnostic tests, it is believed to be more cost effective to perform these tests with just one sensor.

The ventilation and cooling system 134 shown in FIG. 4 also has passage 162 that connects between the waste reservoir 64 and the restriction chamber 144. The waste reservoir 64 is one location in the SDM apparatus 10 where a significant amount of build material can transform into a vapor state and become airborne within the containment chamber 136. Passage 162 draws a small air flow from the waste reservoir 64 into the venturi duct 130 so that this airborne vapor will be brought as directly as possible to the filter 106 and not be allowed to dissipate throughout the SDM apparatus 10. Even though filter 106 can capture the vapor as it dissipates throughout the apparatus, it is undesirable to allow the vapor to dissipate throughout the apparatus for it can condense on the surface of critical components in the SDM apparatus and cause any number of system failures.

Figure 5:
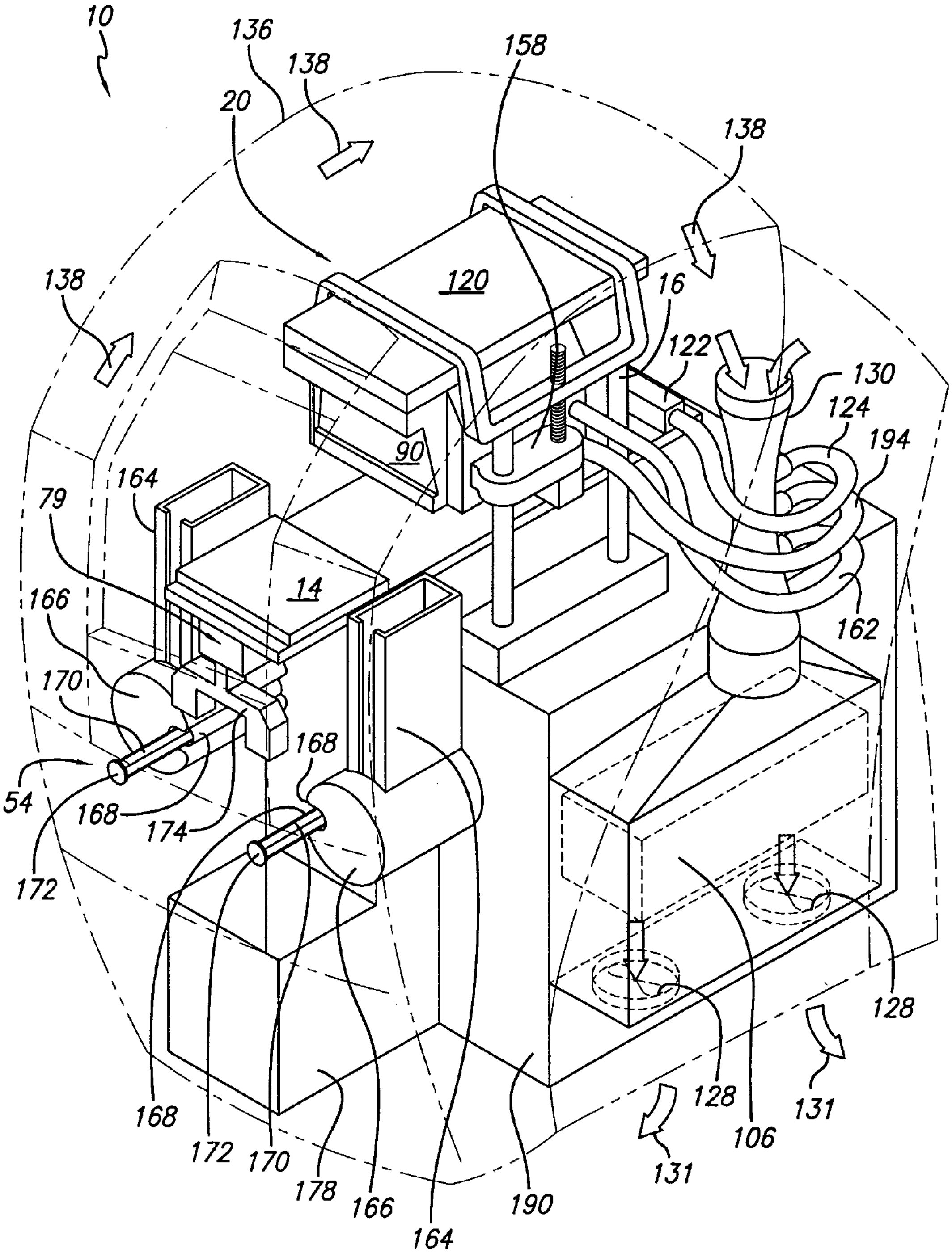
FIG. 5 is a cross-sectional view of another reflector housing assembly for the present invention flash system.
Figure 6:
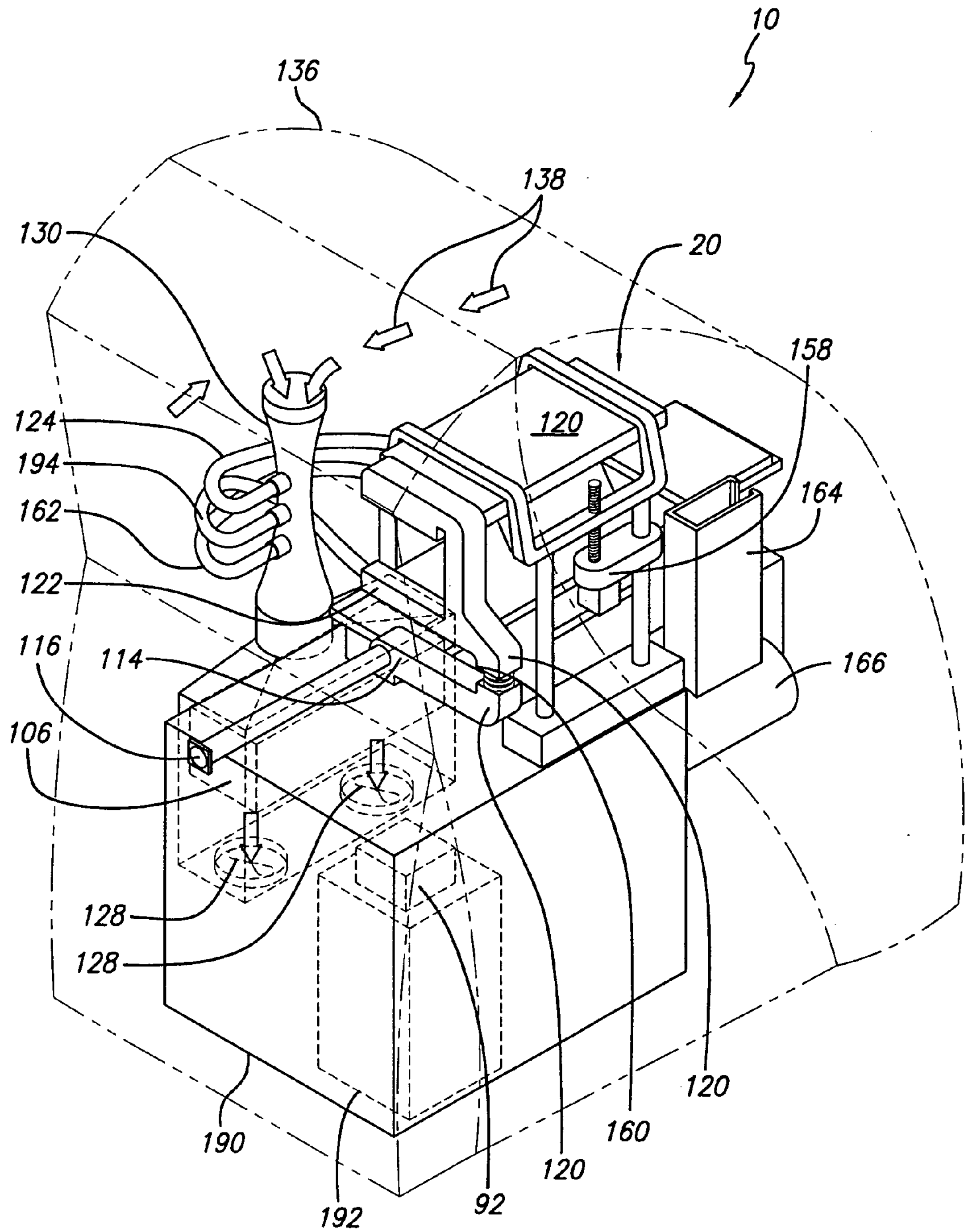
FIG. 6 is a diagrammatic side view of the solid deposition modeling apparatus of FIG. 3 shown in conjunction with the reflector housing assembly of FIG. 4.

Now referring to FIGS. 5 and 6, the ventilation and cooling system 134 discussed in conjunction with FIG. 4 is shown incorporated into the SDM apparatus 10 discussed in conjunction with FIG. 2. FIG. 5 is an isometric view showing the SDM apparatus 10 from the front, and FIG. 6 is an isometric view showing the apparatus 10 from the back. The containment chamber 136 is shown in phantom line so as to reveal other components of the SDM apparatus 10 and the ventilation and cooling system. The dispensing trolley is shown generally by numeral 20, which is raised and lowered by linear screw actuators 158. One of the air ducts 90 can be seen in FIG. 5 where the uniform sheets of air are established by the ventilation and cooling system. The top portion of the air duct 120 can be seen on the top of the dispensing trolley, which delivers air to the fans 78 (not seen) that establish the uniform sheets of air. The air inlet 116 can be seen on the back of the SDM apparatus in FIG. 6, which also shows that air duct 120 has a bellows connection 160 to allow the duct to move with the dispensing trolley 20. The SDM apparatus has a frame 190 in which most all of the components are attached. A subframe 192 is also provided, which holds the computer controller 40 (not shown) and electrical and control harnesses (not shown) which comprise the data transmission routes 42 identified in FIG. 1. The DC power supply 92 can be seen residing on top of the subframe 192.

In FIG. 5, the material feed and waste system is shown generally by numeral 54. The material feed hoppers or magazines 164 hold a supply of material cartridges that are provided to mechanical indexers 166. The mechanical indexers are shown with a material cartridge 168 already loaded for dispensing the material inside each cartridge. A receptacle 170 in the syringe portion 172 of the material cartridges receives the waste material from the planarizer (not shown). This material is exposed to radiation from flash exposure system 79. The exposure is delivered through mirrored waveguide 174 to direct the exposure directly over the receptacles 170. Once the material cartridges 168 have expelled their material and the waste deposited in the receptacles 170 have been sealed, the mechanical indexers 166 drop the spent cartridges into waste bin 178.

Referring now to FIG. 7 a schematic of an alternative embodiment of the present invention ventilation and cooling system 134 is shown. This embodiment is nearly identical to the embodiment shown in FIG. 4, except that air duct 120 does not supply air to fans 78. Instead, an air moving device or air-moving devices 180 are provided to supply outside air over each fan 78. At least one air-moving device 180 is provided to supply outside air over each fan 78, and preferably two air-moving devices 180 are provided for each fan 78. In this embodiment, additional flows of air, identified by numerals 182, enter the SDM apparatus through containment chamber 136. Part of these air flows, identified by numeral 186, supply the air used by fans 78 to establish the uniform sheets of air flow 98. Another part of these air flows, identified by numeral 188, supply outside air that circulates throughout the SDM apparatus within the containment chamber 136. The circulation of air 188 has been found to substantially reduce the temperature within the apparatus. However, in order to maintain the pressure inside the containment chamber 136 below atmospheric pressure, a large blower fan 184 is needed so that the second flow of air 131 maintains a flow rate that is greater than the flow rates of the additional flows of air 182 combined with the flow rate of the first flow of air 108, in order to assure that there is a third flow of air 110 pass into the SDM apparatus through the unsealed gaps of the containment chamber.

Figure 8:
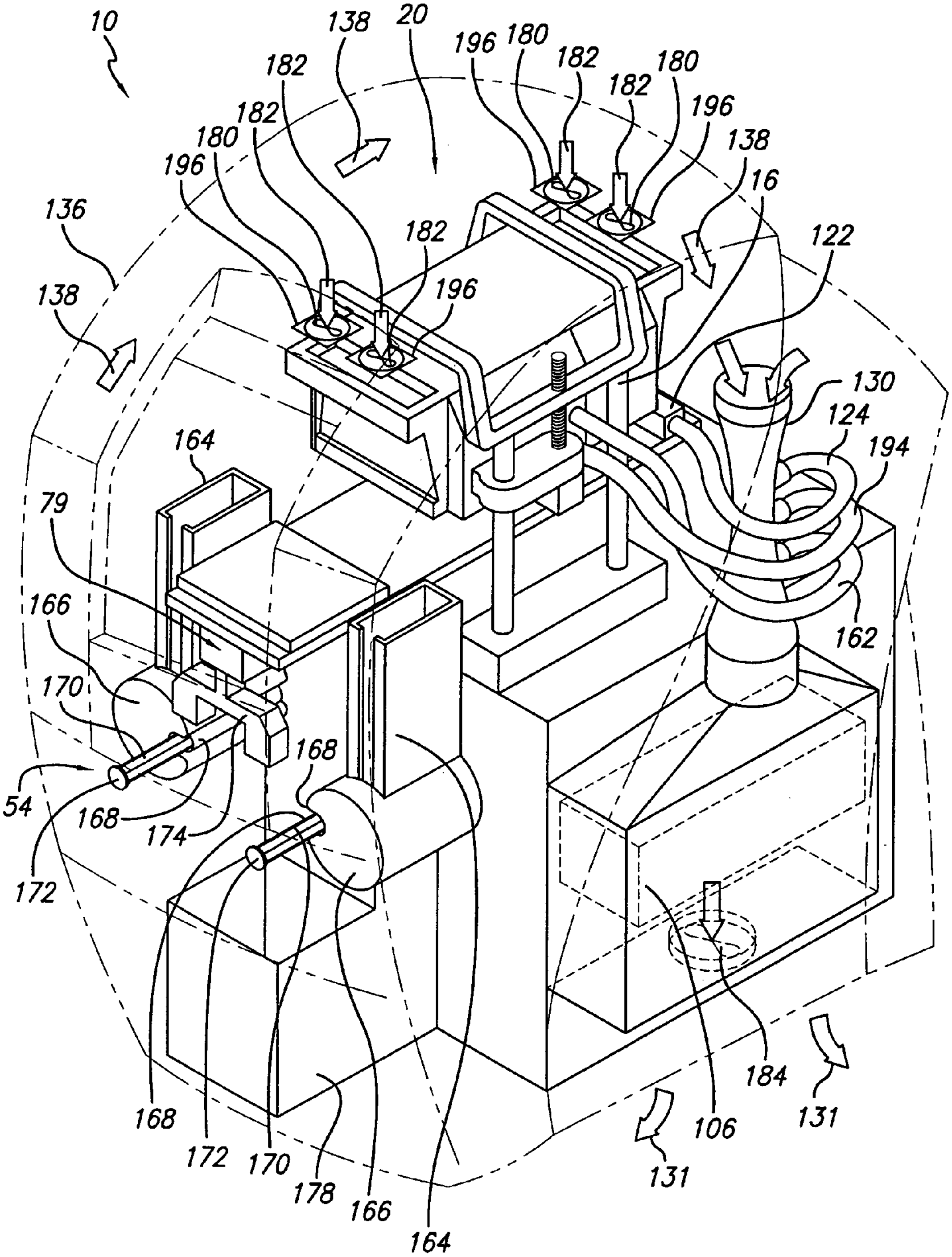
Figure 9:
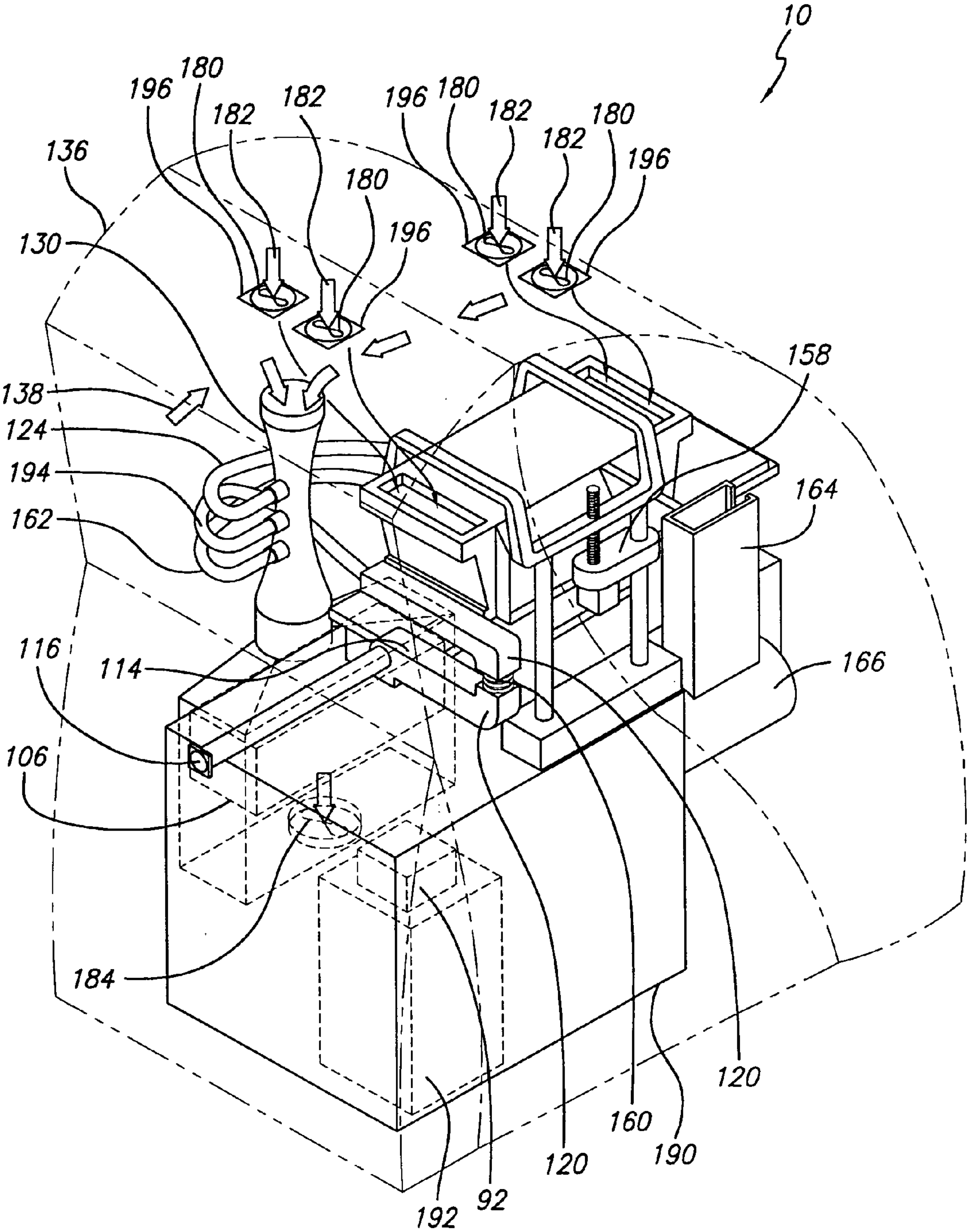

Referring now to FIGS. 8 and 9, front and back isometric views are shown of the SDM apparatus 10 discussed in conjunction with FIG. 2, incorporating the embodiment of the present invention ventilation and cooling system shown in FIG. 7. The SDM apparatus 10 shown in FIGS. 8 and 9 is identical to the one shown in FIGS. 5 and 6, with the exception that four additional inlet ducts, identified by numeral 196, are provided on the top of the containment chamber 136. Just underneath these inlet ducts 196 reside air-moving devices 180, which establish air flows 182 which enter the SDM apparatus as discussed in conjunction with FIG. 7.

Figure 10:
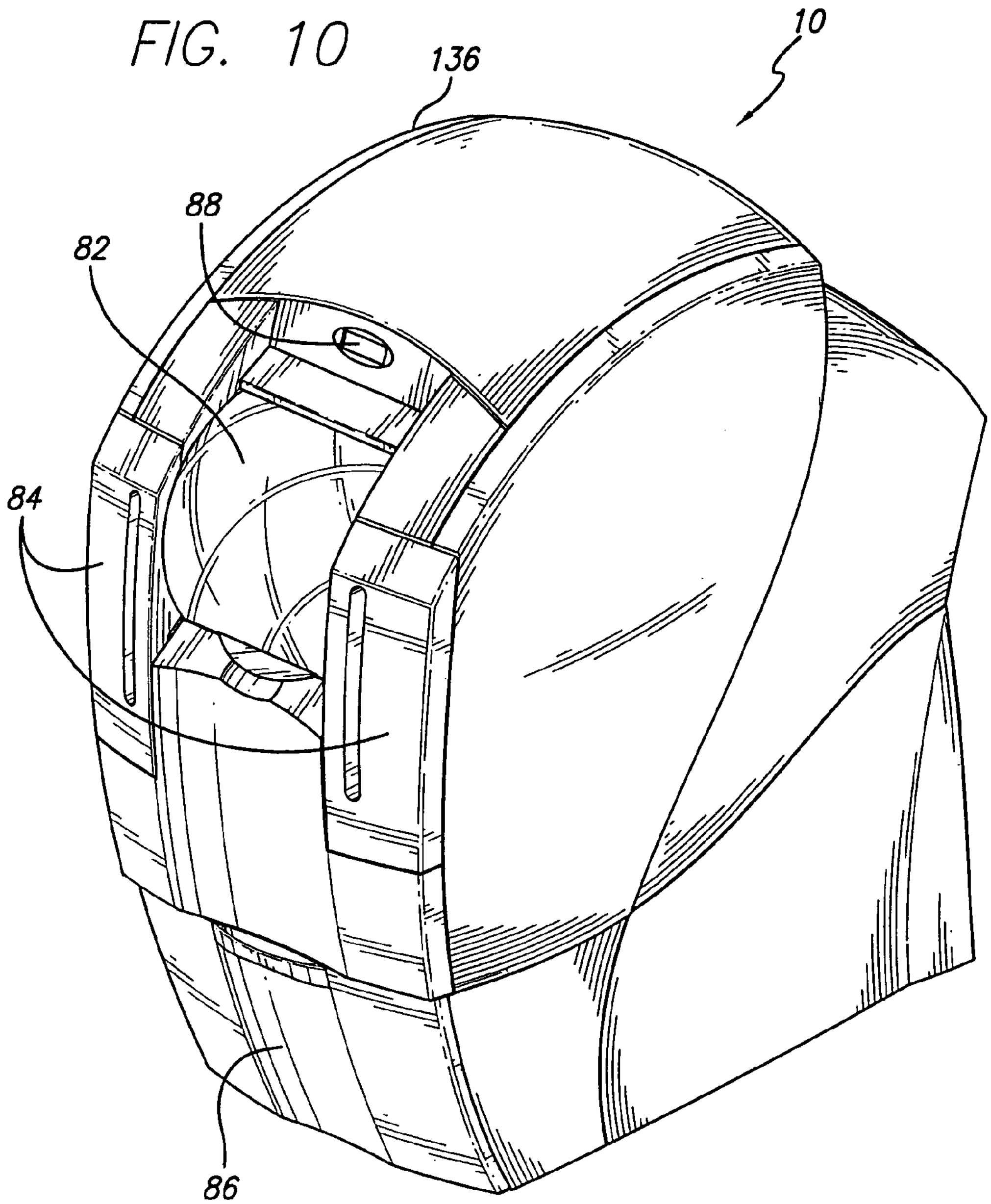

Now referring to FIG. 10, a front isometric view of the SDM apparatus 10 is shown in conjunction with FIGS. 2, 5, and 6. To access the build environment, a slideable door 82 is provided at the front of the apparatus on the containment chamber 136. The door 82 does not allow radiation within the machine to escape into the environment. The apparatus is configured such that it will not operate or turn on with the door 82 open. In addition, when the apparatus is in operation, the door 82 will not open. Material feed doors 84 are provided so that the curable phase change material cartridges can be inserted into the apparatus through one door 84 and the non-curable phase change material cartridges can be inserted into the apparatus through the other door. A waste drawer 86 is provided at the bottom end of the apparatus 10 so that the expelled cartridges in the waste bin (not shown) can be removed from the apparatus. A user interface 88 is provided which is in communication with the external computer previously discussed which tracks receipt of the print command data from the external computer.

All patents and other publications cited herein are incorporated by reference in their entirety. What has been described are preferred embodiments in which modifications and changes may be made without departing from the spirit and scope of the accompanying claims.

What is claimed is:

1. A ventilation and cooling system for capturing airborne contaminants in a selective deposition modeling apparatus dispensing a curable and flowable build material layer by layer to form a three-dimensional object, the ventilation and cooling system comprising:

a containment chamber surrounding the selective deposition modeling apparatus, the containment chamber having a dispensing device for layerwise selective dispensing of the build material, a heat generating exposure system to cure the build material in each layer and at least one air inlet duct and at least one air exit duct, the containment chamber further having unsealed gaps;

at least one air-moving device in communication with the air inlet of the containment chamber creating a first flow of air entering the apparatus;

at least one air-moving device in communication with the air exit duct creating a second flow of air exiting the apparatus;

a third flow of air that is drawn into the apparatus through the unsealed gaps at a flow rate which, when added to the flow rate of the first flow of air, substantially equals the flow rate of the second flow of a when a steady state condition is established between the first flow of air, the second flow of air, and the third flow of air;

a filter in communication with the air exit duct for receiving the second flow of air to capture airborne contaminants from the second flow of air, the airborne contaminants comprising vapors of the curable build material; and wherein the second flow of air has a flow rate that is greater than the flow rate of the first flow of air.

2. The ventilation and cooling system of claim 1 wherein the pressure inside the containment chamber is less than atmospheric pressure when the steady state condition is established.

3. The ventilation and cooling system of claim 2 wherein the pressure inside the containment chamber when the steady state condition is established is between about 0.05 In $H_2O$ to about 1.0 In $H_2O$ less than atmospheric pressure.

4. The ventilation and cooling system of claim 2 further comprising:

a pressure sensor in communication with the selective deposition modeling apparatus, the pressure sensor configured to determine the pressure difference between the pressure inside the containment chamber and atmospheric pressure when the steady state condition is established, wherein to pressure sensor shuts down the selective deposition modeling apparatus when the pressure difference determined indicates the ventilation and cooling system is not functioning properly.

5. The ventilation and cooling system of claim 4 wherein the ventilation and cooling system is not functioning properly when the pressure difference determined by the pressure sensor is about 0.05 In $H_2O$ less than atmospheric pressure.

6. The ventilation and cooling system of claim 2 further comprising:

a pressure sensor in communication with the selective deposition modeling apparatus, the pressure sensor configured to determine the pressure difference between the pressure inside the containment chamber and atmospheric pressure when the steady state condition is established, wherein the pressure sensor signals the selective deposition modeling apparatus that the ventilation and cooling system is not functioning properly when the pressure difference determined indicates the ventilation and cooling system is not functioning properly.

7. The ventilation and cooling system of claim 6 wherein the ventilation and cooling system is not functioning properly when the pressure difference determined by the pressure sensor is about 0.05 In $H_2O$ less than atmospheric pressure.

8. The ventilation and cooling system of claim 2 further comprising:

a pressure sensor in communication with the selective deposition modeling apparatus, the pressure sensor configured to determine the pressure difference between the second flow of air and atmospheric pressure when the steady state condition is established, the pressure difference being measured prior to the second flow of air being received by the filter, wherein the pressure sensor shuts down the selective deposition apparatus when the pressure difference determined by the pressure sensor is greater than a minimum allowable pressure difference indicating the filter needs to be replaced.

9. The ventilation and cooling system of claim 2 further comprising:

a pressure sensor in communication with the selective deposition modeling apparatus, the pressure sensor configured to determine the pressure difference between the second flow of air and atmospheric pressure when the steady state condition is established, the pressure difference being measured prior to the second flow of air being received by the filter, wherein the pressure sensor signals the selective deposition modeling apparatus that the filter needs to be replaced when the pressure difference determined by the pressure sensor is greater than a minimum allowable pressure difference indicating the filter needs to be replaced.

10. The ventilation and cooling system of claim 1 wherein the filter is an activated charcoal filter.

11. The ventilation and cooling system of claim 1 having five air inlet ducts, each air inlet duct in communication with an air-moving device, wherein the first flow of air entering the apparatus comprises the air entering all five inlet ducts.

12. A selective deposition modeling apparatus for forming a three-dimensional object from a flowable and curable material in a build environment, the apparatus receiving data corresponding to layers of the three-dimensional object, the apparatus comprising:

a support means affixed to the apparatus for supporting the three-dimensional object in the build environment;

a dispensing means affixed to the apparatus and in communication with the support means for selectively dispensing the curable material in the build environment according to the computer data to form the layers of the three-dimensional object;

a flash exposure means affixed to the apparatus for curing the dispensed material, the flash exposure means in communication with the support means;

a ventilation and cooling system for capturing airborne contaminants in the apparatus, the ventilation and cooling system comprising:

a) a containment chamber surrounding the selective deposition modeling apparatus, the containment chamber having at least one air inlet duct and one air exit duct and unsealed gaps;

b) at least one air-moving device in communication with the air inlet of the containment chamber creating a first flow of air entering the apparatus;

c) at least one air-moving device in communication with the air exit duct creating a second flow of air exiting the apparatus;

d) a flash cooling system in communication with the flash exposure means for providing steady state cooling of the flash exposure means, the flash cooling system comprising an air duct receiving at least a portion of the first flow of air for cooling the flash exposure means and delivering the portion of the first flow of air to the second flow of air;

e) a third flow of air drawn into the apparatus through the unsealed gaps in the containment chamber at a flow rate which, when added to the flow rate of the first flow of air, substantially equals the flow rate of the second flow of air when a steady state condition is established between the first flow of air, the second flow of air, and the third flow of air;

f) a filter in communication with the air exit duct for receiving the second flow of air to capture airborne contaminants from the second flow of air, the airborne contaminants comprising vapors of the curable build material; and wherein the second flow of air has a flow rate that is greater than the flow rate of the first flow of air.

13. The apparatus of claim 12 wherein the pressure inside the containment chamber is less than atmospheric pressure when the steady state condition is established.

14. The apparatus of claim 13 wherein the pressure inside the containment chamber when the steady state condition is established is between about 0.05 In $H_2O$ to about 1.0 In $H_2O$ less than atmospheric pressure.

15. The apparatus of claim 13 further comprising;

a pressure sensor in communication with the selective deposition modeling apparatus, the pressure sensor configured to determine the pressure difference between the pressure inside the containment chamber and atmospheric pressure when the steady state condition is established, wherein the pressure sensor shuts down the selective deposition modeling apparatus when the pressure difference determined indicates the ventilation and cooling system is not functioning properly.

16. The apparatus of claim 15 wherein the ventilation and cooling system is not functioning properly when the pressure difference determined by the pressure sensor is about 0.05 In $H_2O$ less than atmospheric pressure.

17. The apparatus of claim 13 farther comprising:

a pressure sensor in communication with the selective deposition modeling apparatus, the pressure sensor configured to determine the pressure difference between the pressure inside the containment chamber and atmospheric pressure when the steady state condition is established, wherein the pressure sensor signals the selective deposition modeling apparatus that the ventilation and cooling system is not functioning properly when the pressure difference determined indicates the ventilation and cooling system is not functioning properly.

18. The apparatus of claim 17 wherein the ventilation and cooling system is not functioning properly when the pressure difference determined by the pressure sensor is about 0.05 In $H_2O$ less than atmospheric pressure.

19. The apparatus of claim 13 further comprising:

a pressure sensor in communication with the selective deposition modeling apparatus, the pressure sensor configured to determine the pressure difference between the second flow of air and atmospheric pressure when the steady state condition is established, the pressure difference being measured prior to the second flow of air being received by the filter, wherein the pressure sensor shuts down the selective deposition apparatus when the pressure difference determined by the pressure sensor is greater than a minimum allowable pressure difference indicating the filter needs to be replaced.

20. The apparatus of claim 13 further comprising:

a pressure sensor in communication with the selective deposition modeling apparatus, the pressure sensor configured to determine the pressure difference between the second flow of air and atmospheric pressure when the steady state condition is established, the pressure difference being measured prior to the second flow of air being received by the filter, wherein the pressure sensor signals the selective deposition modeling apparatus that the filter needs to be replaced when the pressure difference determined by the pressure sensor is greater than a minimum allowable pressure difference indicating the filter needs to be replaced.

21. The apparatus of claim 12 wherein the filter is an activated charcoal filter.

22. The apparatus of claim 12 having five air inlet ducts, each air inlet duct in communication with an air-moving device, wherein the first flow of air entering the apparatus comprises the air entering all five inlet ducts.

* * * * *